United States Patent [19]

Gorman et al.

[11] Patent Number: 4,638,678
[45] Date of Patent: Jan. 27, 1987

[54] MANUAL TRANSMISSION SHIFT CONTROL MECHANISM HAVING A REVERSE INHIBITOR

[75] Inventors: Michael J. Gorman, Madison Heights; William R. McClellan, Warren, both of Mich.

[73] Assignee: General Motors Corporation, Detroit, Mich.

[21] Appl. No.: 781,340

[22] Filed: Sep. 30, 1985

[51] Int. Cl.$^4$ ............................................. F16H 57/06
[52] U.S. Cl. ..................................................... 74/476
[58] Field of Search ........................................ 74/476

[56] References Cited

U.S. PATENT DOCUMENTS

| | | | |
|---|---|---|---|
| 3,533,301 | 10/1970 | Hausinger | 74/475 |
| 3,866,488 | 2/1975 | Nakata et al. | 74/476 X |
| 3,933,057 | 1/1976 | Tsuzuki et al. | 74/476 |
| 3,939,724 | 2/1976 | Takahashi et al. | 74/476 |
| 4,174,644 | 11/1979 | Nagy et al. | 74/477 |
| 4,222,283 | 9/1980 | Nagy | 74/476 |
| 4,275,614 | 6/1981 | Okubo et al. | 74/476 |
| 4,324,150 | 4/1982 | Kawamoto | 74/476 |
| 4,381,682 | 5/1983 | Kudo et al. | 74/476 |
| 4,476,740 | 10/1984 | Ida et al. | 74/476 |

FOREIGN PATENT DOCUMENTS 55-107159 8/1980 Japan ..................................... 74/476

Primary Examiner—Allan D. Herrmann
Attorney, Agent, or Firm—Donald F. Scherer

[57] ABSTRACT

A manual transmission control mechanism has a selector mechanism including a lever movable along a neutral path to a plurality of forward gear positions and a reverse gear position. The lever is rotatable from the neutral position to gear ratio selected positions. The control mechanism also includes an inhibitor mechanism having a lever which is spring-loaded into the path of the selector lever and is movable linearly, against the spring, through abutment with the selector lever when the selector lever is moved along the neutral path to the highest forward ratio and reverse ratio position. The spring mechanism returns the inhibitor lever to align with the selector lever when the selector lever is rotated to the highest forward gear ratio selected position. Rotation of the selector lever out of the highest gear ratio position to neutral results in contact with the inhibitor lever and causes rotation of the inhibitor lever against the spring mechanism into abutment with a wall thereby preventing rotation of the selector lever to the reverse gear ratio selected position prior to linear movement along the neutral path.

2 Claims, 6 Drawing Figures

MANUAL TRANSMISSION SHIFT CONTROL MECHANISM HAVING A REVERSE INHIBITOR

BACKGROUND OF THE INVENTION

This invention relates to shift controls for manual transmissions and more particularly to such controls having a reverse inhibitor.

Prior art reverse inhibitors utilize a great number of components or require extremely accurate machining and assembly to ensure proper operation.

SUMMARY OF THE INVENTION

The present invention has only three components in addition to an otherwise standard or conventional gear change mechanism. These components do not require other than ordinary manufacturing and assembly.

It is therefore an object of this invention to provide an improved reverse inhibitor mechanism for a manually shifted transmission with a minimum of components and simplicity of manufacture.

It is another object of this invention to provide an improved control mechanism for a manually shifted transmission having a reverse inhibitor wherein the control mechanism has a selector lever movable linearly along a neutral path to a plurality of preselection positions for selecting from pairs of ratio gears, including a high forward ratio and a reverse ratio, and an inhibitor lever mechanism which is moved linearly from an "at rest" position against a spring by the selector lever when the selector lever is moved linearly to the preselection position for the high ratio and reverse ratio, and the inhibitor lever is urged by the spring to the "at rest" position if the selector lever is rotated to select the high ratio so that rotation of the selector lever from the high ratio position to the reverse position is prevented during downshifting from the high ratio position prior to linear movement of the selector lever along the neutral path from the high ratio and reverse ratio preselection position.

It is a further object of this invention to provide an improved shift control mechanism for a manually shifted transmission including an inhibitor lever slidably and rotatably mounted on a pin and being spring-loaded to a set position aligned with the linear path of a transmission selector lever so that linear movement of the selector lever along a neutral path to a forward-reverse preselection position moves the inhibitor lever linearly on the pin against the spring and rotation of the selector lever to the forward position permits the spring to return the inhibitor lever to the set position so that rotation of the selector lever from the forward position to the forward-reverse preselection position will cause abutment with the inhibitor lever and pivoting thereof on the pin against the force of the spring into abutment with a wall to prevent rotation of the selector lever to the reverse position prior to linear movement of the selector lever along the neutral path out of the forward-reverse preselection position.

DESCRIPTION OF THE DRAWING

These and other objects and advantages of the present invention will be more apparent from the following description and drawings in which.

Figure 1:
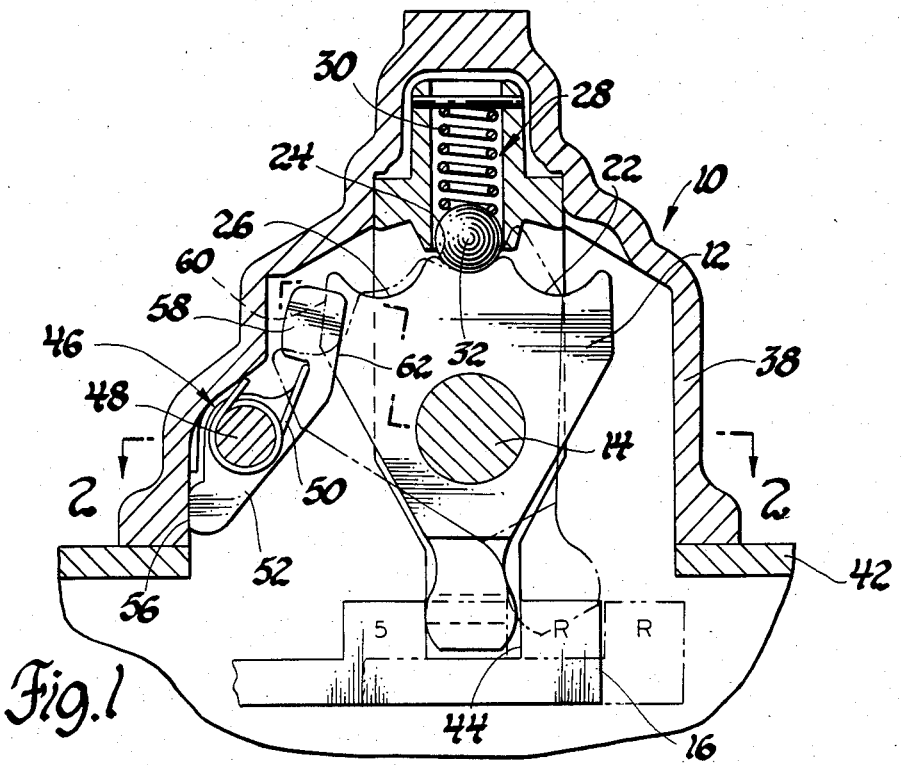
FIG. 1 is a cross-sectional elevational view of a portion of a transmission selector in one mode of operation.
Figure 2:
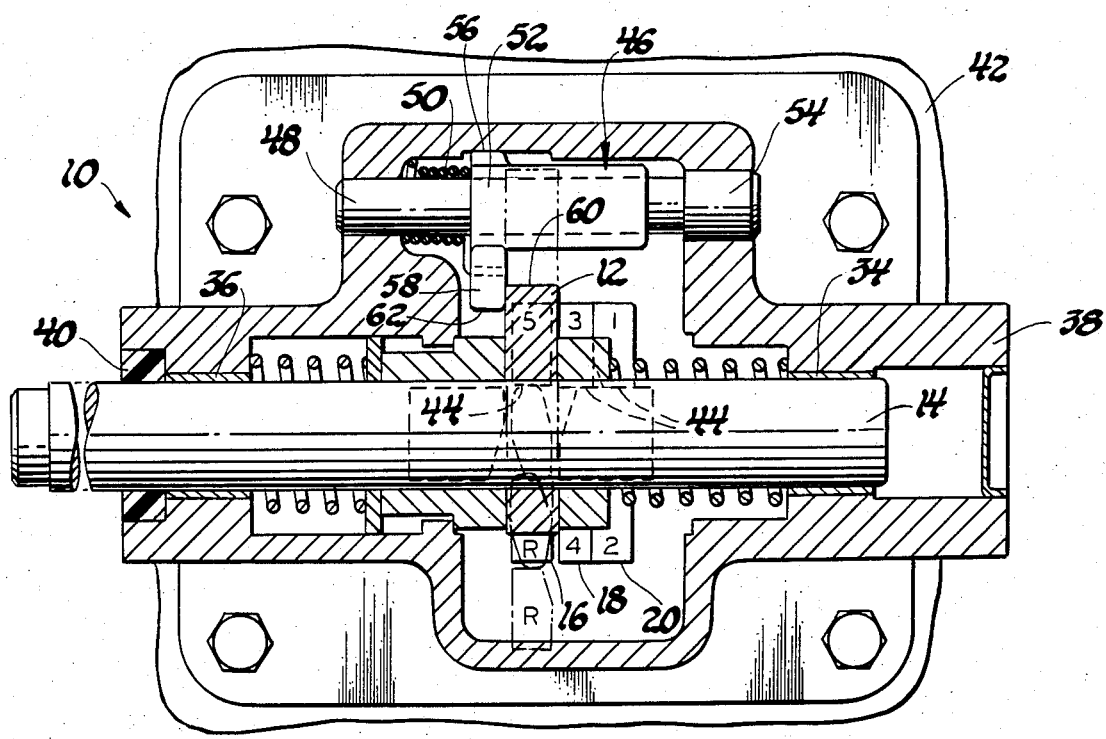
FIG. 2 is a view taken along line 2—2 of FIG. 1.

Referring to the drawings, wherein like characters represent the same or corresponding parts throughout the several views, there is seen in FIGS. 1 and 2 a transmission selector mechanism, generally designated 10, and including selector lever 12 which is secured to a selector shaft 14 and a plurality of gear selector rods 16, 18 and 20. The selector lever 12 has three depressions 22, 24 and 26 formed therein which cooperate with a detent mechanism 28 to maintain the selector lever 12 in the position selected by the operator through rotary manipulation of the selector shaft 14. The detent mechanism 28 includes a spring 30 and a ball 32, which ball 32 engages the depressions formed in the selector lever 12.

Selector shaft 14 is slidably and rotatably disposed on a pair of bearings 34 and 36 which are secured in a housing 38. Also disposed in the housing 38 is a seal 40 which prevents the leakage of lubricant from the inside of the housing 38. The housing 38 is secured to a transmission housing 42 which houses a plurality of conventional transmission components, not shown. As is well-known, these transmission components are comprised of gear members which establish drive ratios or gear ratios between the input and output shafts of a transmission The gear ratios are normally established through conventional synchronizer mechanisms which are manipulated by yokes operatively connected to the selector rods 16, 18 and 20. These mechanisms are conventional and well-known such that it is not believed that drawings or further descriptions thereof are necessary to an understanding of the present invention. An example of a transmission in which this mechanism might be used is shown in U.S. Pat. No. 4,222,283 issued Sept. 16, 1980 to Nagy or U.S. Pat. No. 4,174,644 issued Nov. 20, 1979 to Nagy et al.

The selector shaft 14 is manipulated linearly in the bearings 34 and 36 and rotatably in said bearings by a conventional shift tower, not shown. The selector lever 12, when viewed in the solid line position of FIGS. 1 and 2, is operating in the neutral state of transmission selection. During the neutral state, the selector lever is free to move linearly in the respective gates or slots 44 formed in the selector rods 16, 18 and 20. When the selector lever 12 is positioned in one of the slots 44, it is placed in a preselection position. The selector shaft 14 may be rotated from the respective preselection position to permit selection of either first or second ratio with selector rod 20, third or fourth ratio with selector rod 18, or fifth or reverse ratio with selector rod 16.

Figures 3, 4:
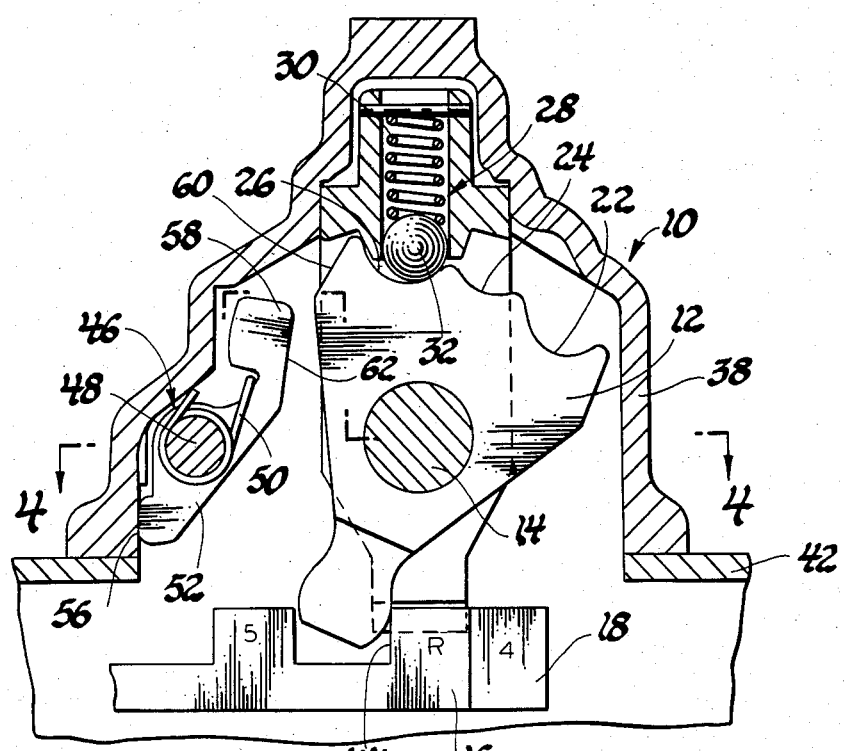
FIG. 3 is a sectional view similar to FIG. 1 showing the transmission selector in another mode of operation.
FIG. 4 is a view taken along line 4—4 of FIG. 3.

Also disposed in the housing 38 is a reverse inhibitor mechanism, generally designated 46, which includes a rod or pin 48, a spring 50 and an inhibitor lever 52. The inhibitor lever 52 is slidably and rotatably disposed on the rod 48. The rod 48 is secured in the housing 38 by a press fit at 54. The inhibitor lever 52 is urged by the spring 50 to an "at rest" or set position, as shown in FIGS. 3 and 4. In the "at rest" position, the lever 52 has an abutment surface 56 which abuts the inner wall of housing 38. The inhibitor lever 52 is disposed in the "at rest" position whenever the transmission selector lever 12 is aligned with the 1-2 selector rod 20, the 3-4 selector rod 18, or is rotated to the fifth gear ratio selected position. FIGS. 3 and 4 show the selector lever 12 rotated to the fifth gear ratio selected position.

As the selector lever 12 is moved linearly from the slot 44 in the 3-4 selector rod 18 to the slot in the 5-R selector rod 16, it will abut an upper portion 58 of the inhibitor lever 52 such that linear movement of the selector lever 12 to the fifth-reverse (5-R) preselection position will result in linear movement of the inhibitor lever 52 along rod 48 against the spring 50 to the position shown in FIGS. 1 and 2. If, from this position, the selector lever 12 is rotated to the reverse gear ratio, the inhibitor lever 52 will remain in the position shown and the selector lever 12 will be moved to the phantom position shown in FIG. 1. Thus, if the selector lever 12 is moved linearly from the 3-4 position to the 5-R position, reverse gear ratio can be selected Also, from the 5-R gear ratio, the fifth gear ratio can be selected as shown in FIGS. 3 and 4. When the fifth gear ratio is selected, the inhibitor lever 52 will be moved linearly by the spring 50 along rod 48 to the "at rest" position as seen in FIG. 4, with the inhibitor lever 52 aligned with the selector lever 12.

Figure 5:
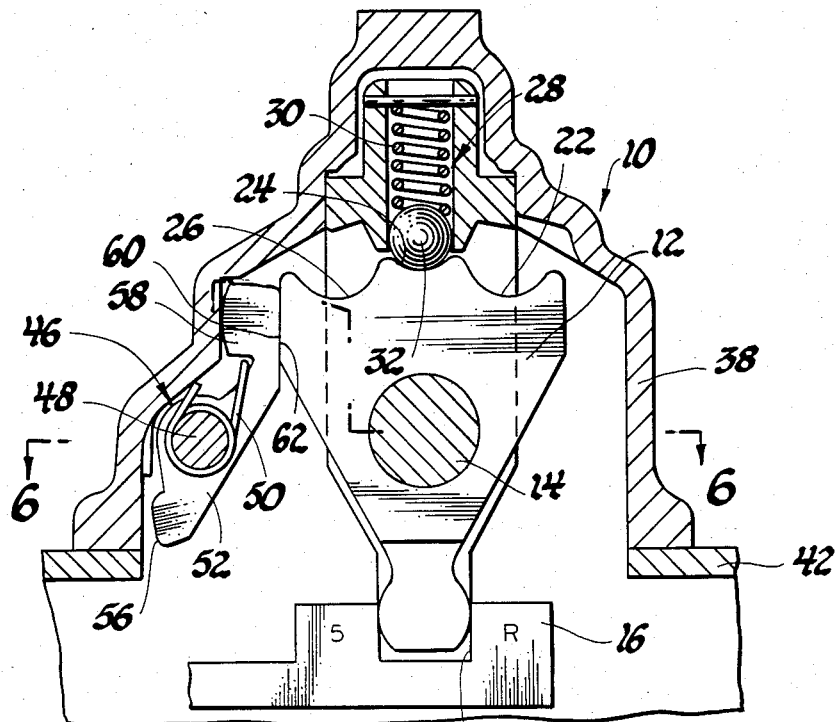
FIG. 5 is a view similar to FIG. 1 showing the mechanism in a further operating mode.
Figure 6:
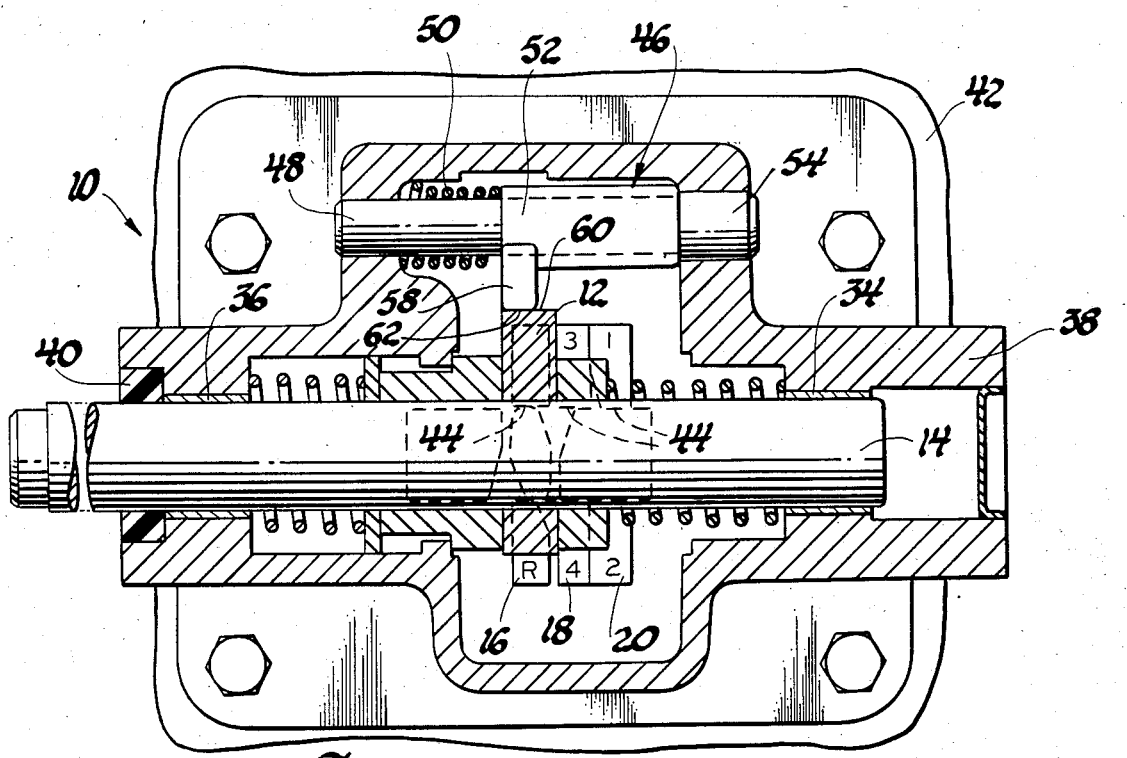
FIG. 6 is a view taken along line 6—6 of FIG. 5.

Rotation or pivoting of the selector lever 12 from the fifth ratio position to the neutral position will cause abutment between flat surfaces 60 on selector lever 12 and flat surface 62 on the inhibitor lever 52. This abutment and further pivoting of the lever 12 to the neutral position will cause pivoting of the inhibitor lever 52 on the rod 48 against the torsional force in spring 50 until the upper portion 58 of the inhibitor lever 52 abuts the inner wall of housing 38. This abutment prevents further pivoting of the lever 12 in a counterclockwise direction, as seen in FIG. 5. Therefore, pivoting of the lever 12 from the fifth position shown in FIG. 3 to the reverse position shown in FIG. 1 is prevented by the inhibitor lever 52 as shown in FIG. 5. When the lever 12, through manipulation of selector shaft 14, is moved linearly from the 5-R slot 44 to the 3-4 slot 44, the inhibitor lever 52 will be returned to the "at rest" position by the spring 50 as shown in FIG. 3. From this position, it is then possible to manipulate the selector rod linearly to the 5-R preselection position and then rotatably to select the reverse ratio.

However, from the above description, it is evident direct manipulation of the selector lever 12 from the fifth to the reverse ratios is not permitted. It should also be appreciated, from the foregoing description, that the spring 50 controls both the linear and rotary positioning of the inhibitor lever 52 along the rod 48 until the "at rest" position is established. The spring 50 also provides the resistance or reaction forces for the inhibitor lever 52 whenever linear movement to the position shown in FIG. 1 or rotary movement to the position shown in FIG. 5 occurs.

The above description makes it apparent that the reverse inhibitor utilized herein is attained with a minimum number of parts; namely, three, all of which are manufactured by conventional processes. The only machining necessary on the lever 52 is the bore in which the rod 48 is disposed. Portion 58, surface 56 and surface 62 can remain in an as cast or as forged condition. The rod 48 could, in the alternative, be bonded with a number of the well-known commercially available adhesives. Thus, the assembly of the inhibitor system within the transmission housing is relatively simple.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A control mechanism for a manually shifted transmission including an inhibitor mechanism which prevents direct shifting from the highest forward speed ratio to the reverse speed ratio, the transmission having a neutral condition, a plurality of forward speed ratio positions including a highest ratio and a lowest ratio and a reverse ratio position, said control comprising; a housing; selector lever means movable linearly along a selector axis in the neutral condition between preselecting conditions for each of the forward speed ratio positions and the reverse speed ratio position and being rotatable about the selector axis from the neutral condition to a select position for the desired speed ratio; and reverse inhibitor means including a support pin secured in said housing and defining an inhibitor axis parallel to and offset from the selector axis, inhibitor lever means having two abutment pads and being slidably and rotatably disposed on said support pin and spring means for simultaneously urging said inhibitor lever means linearly and rotatably to one position to force one of the abutment pads into abutment with said housing to position a portion of the inhibitor lever means in linear alignment with said selector lever means, said selector lever means moving said inhibitor lever means linearly against said spring means when said selector lever means is moved in the neutral condition to the preselection condition for the highest speed ratio position and the reverse speed ratio position, said selector lever means moving out of linear alignment and out of physical contact with said inhibitor lever means when the highest forward speed ratio position is selected by pivotal movement of said selector lever means, said spring means returning said inhibitor lever means to said one position when said highest forward speed ratio position is selected to align said inhibitor lever means with the path of pivotal movement of said selector lever means, said selector lever means contacting and pivoting said inhibitor lever means upon pivoting of said selector lever means from the highest forward speed ratio position to the highest ratio neutral preselecting condition and said inhibitor lever means pivoting against said spring means until the other of said abutment pads contacts with said housing to prevent further pivoting of said selector lever means toward said reverse speed ratio position prior to linear movement of said selector lever means in the neutral condition toward said lowest forward speed ratio preselecting condition.

2. A control mechanism for a manually shifted transmission having a neutral condition, a plurality of forward speed ratio positions including a highest ratio and a lowest ratio and a reverse ratio position, said control comprising; a housing; selector lever means movable linearly along a selector axis in the neutral condition between preselecting conditions for each of the forward speed ratio positions and the reverse speed ratio position and being rotatable about the selector axis from the neutral condition to a select position for the desired speed ratio; and reverse inhibitor means including support means secured in said housing on a support axis parallel to and offset from said selector axis, inhibitor lever means having three abutment means and being slidably and rotatably disposed on said support means and said support axis and spring means for simultaneously urging said inhibitor lever means linearly and rotatably to a set position with the first of said abutment means contacting said housing, said set position aligning a portion of the inhibitor lever means in linear alignment with said selector lever means, said selector lever means moving said inhibitor lever means linearly against said spring means when said selector lever means is moved in the neutral condition to the preselection condition for the highest speed ratio position and the reverse speed ratio position, said selector lever means moving out of linear alignment and physical contact with said inhibitor lever means when the highest forward speed ratio position is selected by pivotal movement of said selector lever means, said spring means returning said inhibitor lever means to said set position when said highest forward speed ratio position is selected to align said inhibitor lever means laterally with the pivotal movement path of said selector lever means, said selector lever means physically contacting the second of said abutment means and pivoting said inhibitor lever means on said support means against said spring means upon pivoting of said selector lever means from the highest forward speed ratio position to the highest ratio preselecting condition, said inhibitor lever means pivoting against said spring means until the third of said abutment means contacts said housing to prevent further pivoting of said selector lever means to said reverse speed ratio position prior to linear movement of said selector lever means in the neutral condition toward said lowest forward speed ratio preselecting condition.

* * * * *